Patented Jan. 3, 1933

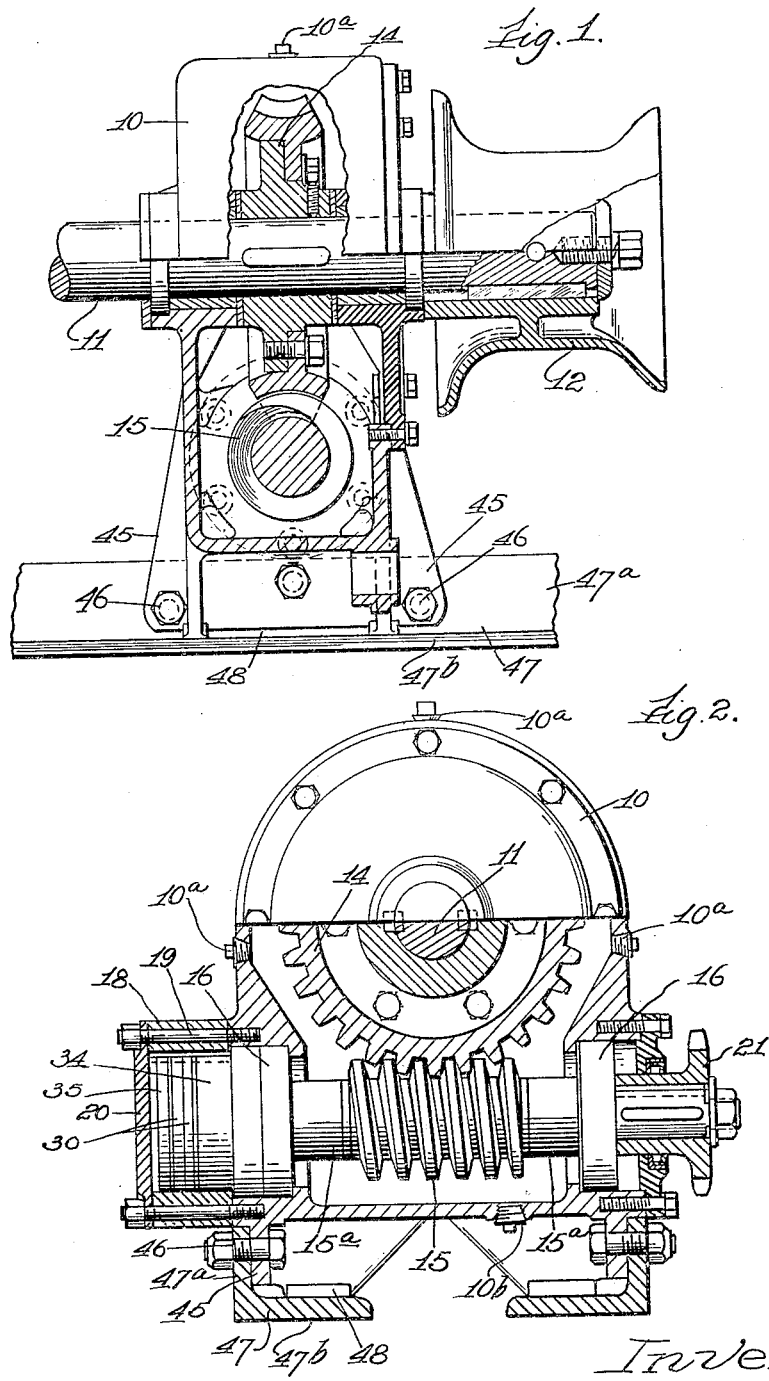

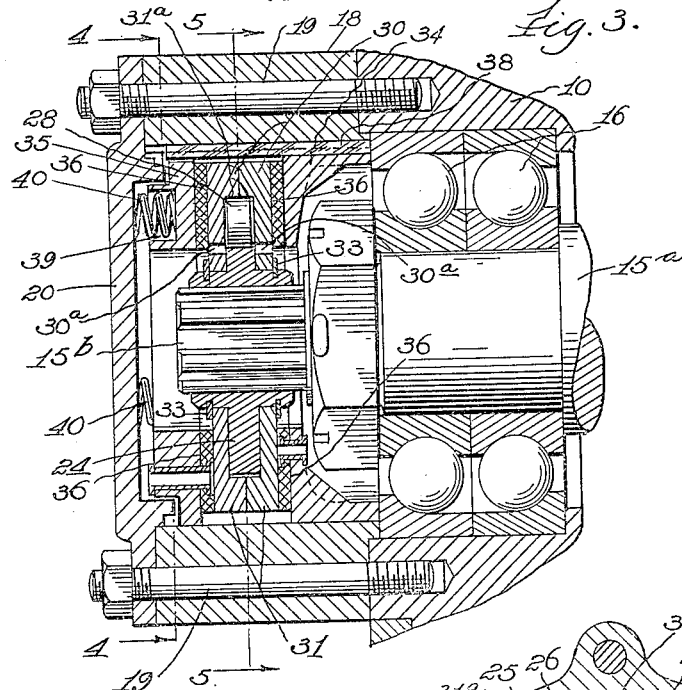
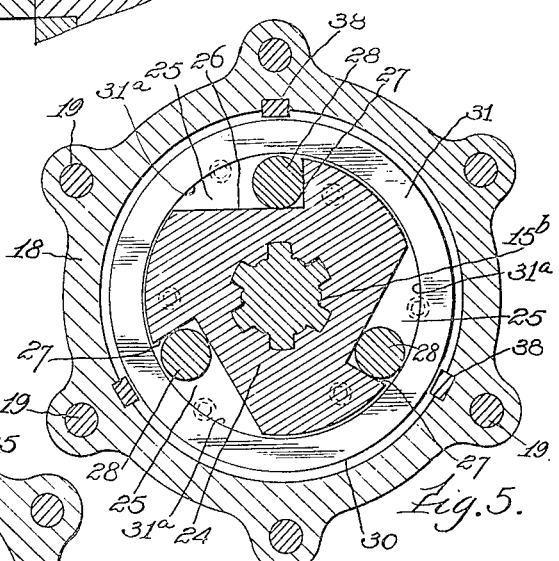
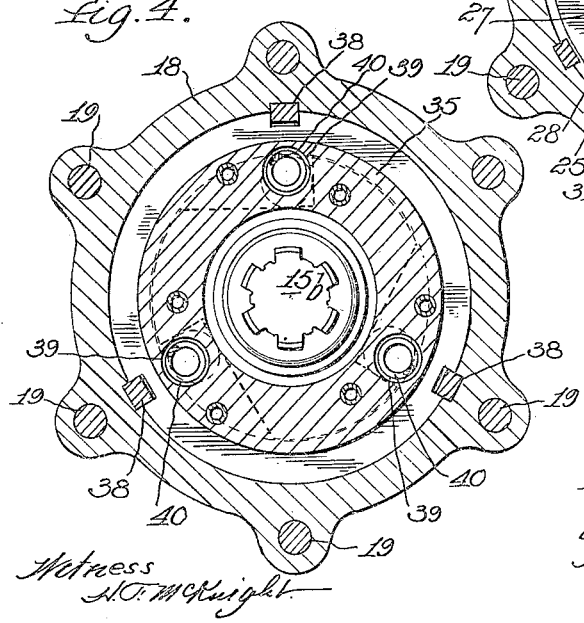

1,892,940

UNITED STATES PATENT OFFICE

NICHOLAI M. ERDAHL, OF EDGERTON, WISCONSIN, ASSIGNOR TO HIGHWAY TRAILER COMPANY, OF EDGERTON, WISCONSIN, A CORPORATION OF WISCONSIN

BRAKE

Application filed January 19, 1931. Serial No. 509,567.

The present invention has reference to brake mechanisms, and more particularly to brake mechanisms of the type adapted for automatically opposing reverse rotation of a driving element, as embodied frequently in winch mechanisms. One of the objects of this invention is to provide an improved and simplified construction that is quick acting and positive in operation. Another object is to provide an improved construction that is fairly compact while affording a comparatively large braking area and which is arranged for insuring ample lubrication of the brake elements; the construction being such as to expedite dissipation of the heat created by operative engagement of the brake elements. The invention consists in certain features and elements of construction in combination, as herein shown and described, and as indicated by the claims.

In the drawings:

Figure 1 is a view in elevation with parts in section, and showing a winch mechanism embodying the brake structure constituting the present invention.

Figure 2 is a vertical section through the winch driving mechanism taken axially of the worm shaft and showing the brake mechanism in elevation.

Figure 3 is an enlarged axial section of the brake mechanism.

Figures 4 and 5 are transverse sectional views taken as indicated at lines, 4—4 and 5—5 respectively on Figure 3.

In its broadest aspect the present invention is capable of adaptation in numerous mechanisms for opposing or preventing reverse rotation of a revolving driving element such as an elevator head shaft, but for purposes of illustration the invention is shown in association with a winch mechanism. Referring now in detail to the drawings,—10 indicates a housing for the winch-driving mechanism, which includes a shaft, 11, journaled in said housing and having one end extending laterally thereof on which extension is rigidly keyed a conventional type of winch drum indicated at 12. Keyed on the shaft, 11, in the housing is a worm gear, 14, which operatively meshes with a driving worm, 15, the ends of which are formed to provide stub shafts, $15^a$, which are journaled in roller bearings, 16, mounted in said housing, 10.

As is well understood in the mechanical arts, it is undesirable to employ small pitch cast worm gearing for mechanism such as winches and the like. However, it will be manifest that should a coarse or steep pitch gearing be employed, there is a strong possibility of the worm being driven by the load in the reverse direction when the application of power is discontinued. In such cases, therefore, it is desirable to provide some form of mechanism, preferably automatic, which is arranged to oppose and prevent such reverse rotation and also arranged to automatically release itself when the worm is again driven by power in the opposite or normal direction.

Associated with one of the stub shaft ends, $15^a$, of the worm is the brake mechanism embodying the present invention; it includes an annular housing, 18, which is rigidly secured to the housing, 10, by means of stud bolts, 19. The brake mechanism proper is mounted concentrically with respect to the stub shaft, $15^a$, in said housing and a cover, 20, is provided to complete the enclosure. The worm shaft may be driven in any suitable manner and for purposes of illustration, is herein shown as deriving its power through a sprocket wheel, 21, keyed on the opposite stub end, $15^a$, of the worm, which sprocket may be operatively connected to any suitable driving member.

The brake mechanism includes a cam element, 24, which is mounted on a splined reduced end, $15^b$, of one of the stubs, $15^a$, which connection permits the cam to be quickly removed and replaced in reverse relation thereon to accommodate either right or left hand worms without effecting any change whatsoever in the brake mechanism, other than the reversal of its operation. The cam 24, includes a central disk or web portion whose outer periphery is provided with a plurality of notches, 25, each of which is formed by a flat cam surface, 26, extending non-radially from the outer periphery inwardly and terminating a substantial distance from the periphery so as to provide a space to accommodate a roller, 28, which in the normal direction of rotation of the worm is seated in the corner formed by the cam surface, 26, and the transversely related surface, 27, defining the notch, 25. Journaled on the hubs of the cam element, 24, on opposite sides of the notched web portion are a pair of rotatable, normally stationary brake disks, 30, whose outer peripheries are provided with inwardly extending annular flanges, 31, abutting each other at a plane approximately central with respect to the web portion of the cam, as seen in Figure 3.

The flanges, 31, are dimensioned to space the disks, 30, apart sufficiently to allow running clearance between them for the cam, 24, and to permit free movement of the rollers, 28, in its notches, 25. These brake disks, 30, are held in place on the hub of the cam by the spring retaining rings, 33, and co-operate with non-rotatable braking elements, 34 and 35, respectively; the adjacent surfaces of which have rigidly secured thereto surfacing of suitable brake lining material indicated at 36. Both of the non-rotatable braking elements, 34 and 35, are held against rotation by keys indicated at 38, in the brake housing, 18, as seen in Figures 3 and 4; the part 34, being fixed in place while the part, 35, is axially movable in the housing along said keys. The outer brake element, 35, has its outer surface formed with a plurality of radially spaced pockets, 39, in which are seated coil springs, 40, reacting against the inner side of the cover, 20, for imparting adequate pressure to all the brake elements to maintain said brake elements in operative contact at all times. It is to be understood that said springs exert sufficient pressure to practically clamp and hold the disks, 30, against rotation. This construction provides a more or less "floating" action in that the cam, 24, and the clutch disks, 30, may shift axially to accommodate any variance in pressures of the springs 40.

Just as soon as the worm, 15, commences to rotate in reverse direction, as it may do under pressure transmitted by the load to the worm, 14, when the source of power is disconnected, it will be apparent that almost instantly the rotation of the cam, 24, in the opposite direction to that in which it normally travels tends to leave its rollers, 28, stationary, but the cam surfaces, 26, will crowd the rollers, 28, outwardly against the adjacent inner peripheries, 31ᵃ, of the normally stationary, rotatable braking disks, 30, thereby tending to cause these elements to rotate with the cam. Because of the pressure exerted by the springs, 40, rotation of the elements, 30, is resisted and thus the worm, 15, and its gear, 14, are held against reverse rotation. It will be manifest that when the worm is again rotated in the normal direction under power, the brake automatically and quickly releases its control, as the cam surfaces, 26, move in the direction to free the rollers, and thus permitting them to shift into the corners formed by the surfaces, 26 and 27, where they are clear out of contact with the surfaces of the brake disks, 30.

The brake mechanism, as will be seen from Figure 3, is constructed to permit unobstructed lubrication of the parts, and affords maximum cooling area to insure prompt dissipation of any heat generated due to the braking action of the elements. The web portions of the disks, 30, are provided with a plurality of radially spaced apertures, 30ᵃ, so as to admit lubrication to the cam surface, and the rollers, 28. The housing of the worm gearing has its wall provided with openings fitted with convenient plugs indicated at 10ᵃ, for the introduction of a fresh supply of lubricant while the bottom of the housing is also provided with a drain plug, 10ᵇ.

In winch mechanisms it has always been a problem to provide proper anchorage especially where the mechanism is mounted on a vehicle. And it is one of the purposes of the present invention to provide a suitable supporting base for such a winch mechanism so as to counteract lateral stresses and provide a reenforced supporting structure. For this purpose I form the housing, 10, with downwardly extending legs or feet, 45, which are adapted to be secured by bolts, 46, to the upstanding legs, 47ᵃ, of structural angle members, 47, which may be secured in any convenient manner to the chassis of the vehicle. The housing is also provided with downwardly extending web portions which terminate in horizontally extending feet, 48, which are adapted to rest on top of the horizontally extending leg portions, 47ᵇ, of the angles, 47. This particular arrangement of the supporting feet, 45 and 48, effectively oppose lateral stresses which are imparted to the mechanism when it is in use.

Although I have shown and described one particular embodiment in my invention, I do not wish to be limited to the particular construction illustrated except as indicated by the claims.

I claim:

1. In a brake mechanism, a housing, two spaced-apart non-rotatable brake elements in said housing having opposed braking surfaces; two normally stationary brake elements interposed between said spaced-apart brake elements, and having braking surfaces cooperating respectively with said opposed braking surfaces and with each other, said normally stationary braking elements being adapted for rotation relatively to their respectively cooperating non-rotative elements; yielding means for urging said non-rotatable and said normally stationary brake elements toward each other for frictional cooperation of their respectively fixed and rotatable surfaces with each other, one of said non-rotatable brake elements being axially movable toward the other, and said yielding means being arranged for directly acting upon said axially movable brake element for maintaining the brake surfaces of said brake elements in co-operative engagement.

2. In a brake mechanism, a housing, two spaced-apart non-rotatable brake elements in said housing having opposite braking surfaces, two normally stationary brake elements interposed between said spaced-apart brake elements and having cooperating braking surfaces, said normally stationary brake elements being adapted for rotation relatively to the respectively cooperating non-rotative elements, means for yieldingly urging the cooperating brake elements toward each other with their braking surfaces in engagement for resisting rotation of one of said elements relatively to the other; a rotatable member having a portion extending into the housing, an operating cam member mounted on said rotatable member for rotation therewith, and having a plurality of camming protrusions, and means interposed between said cam protrusions and the normally stationary brake element cooperating with said cam member for engagement of the cam member with the brake member for rotating the latter with said rotatable member.

3. In a brake mechanism, a housing, two spaced apart non-rotatable brake elements in said housing having opposed braking surfaces, two normally stationary brake elements interposed between said spaced apart brake elements, and having co-operating braking surfaces, said normally stationary brake elements being adapted for rotation relative to their co-operating non-rotative elements, means for yieldingly urging the brake elements toward each other with their braking surfaces in engagement for resisting rotation of one of said elements relative to another, a rotatable member having a portion extending into the housing, an operating cam mounted on said rotatable member and having one or more non-radial cam surfaces, and a roller associated with each cam surface and adapted to be crowded against the internal surfaces of said rotatable brake elements, tending to rotate the same.

4. In the construction defined in claim 3, said rotatable brake elements including web portions having journal support on hub portions of the cam and substantially encasing said cam.

5. In the construction defined in claim 3, said rotatable brake elements including web portions having journal support on hub portions of the cam and substantially encasing said cam, together with means for holding said brake elements in place on said cam.

6. In the construction defined in claim 3, said rotatable brake elements including web portions having journal support on hub portions of the cam and substantially encasing said cam, together with means for holding said brake elements in place on said cam, said web portions of the rotatable brake elements having openings to admit lubricant to the surfaces of the cam.

7. In a brake mechanism, a housing, two spaced apart non-rotatable brake elements in said housing and having opposed braking surfaces, a two-part normally stationary brake element interposed between said spaced apart brake elements and having braking surfaces co-operating therewith, one of said non-rotatable brake elements being axially movable toward the other, and said interposed brake element being adapted for rotation relative to the co-operating non-rotatable brake elements, yielding means acting on said axially movable non-rotative brake element for urging the braking surfaces into operative engagement, a rotatable member disposed concentrically within said two-part brake element, an operating cam member mounted thereon for axial accommodation to the movement of the brake elements, said cam member having camming protrusions, and means interposed between said cam protrusions and the normally stationary brake element for frictional cooperation of the cam member with said normally stationary brake element for rotating the latter by the former, said cam protrusions being formed for said cooperation in the rotation of said rotatable member in one direction only.

NICHOLAI M. ERDAHL.